Feb. 9, 1926.
F. W. BOMAN
1,571,995
CONVERTIBLE PLOW FRAME
Filed August 12, 1922
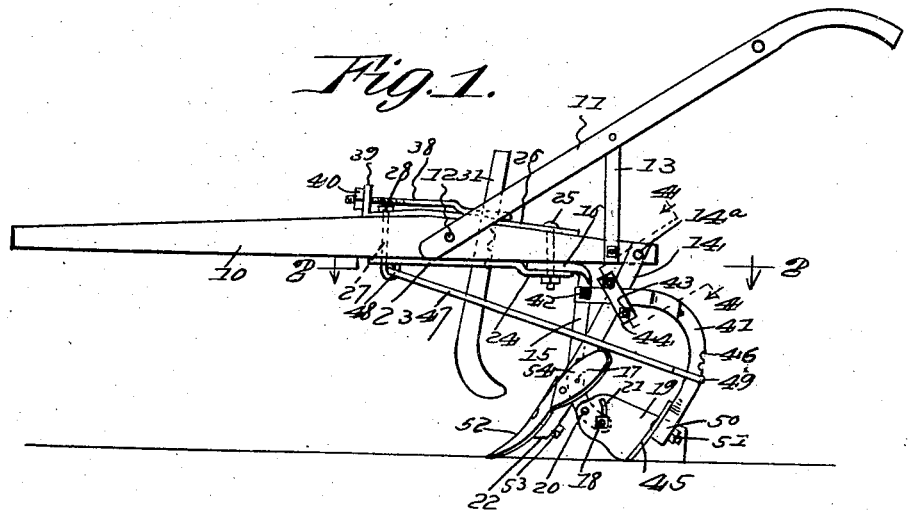
Fig. 1.
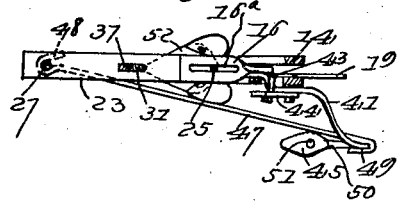
Fig. 2.
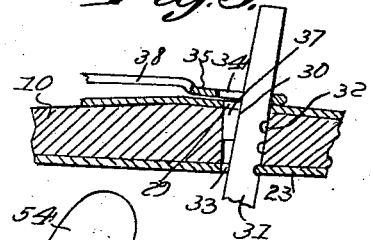
Fig. 3.
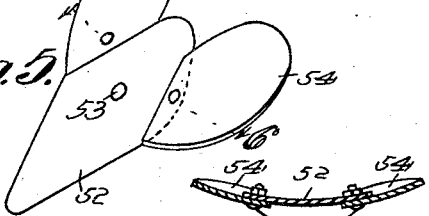
Fig. 5.
Fig. 4.
Fig. 6.
Fig. 7.
Inventor
F. W. Boman,
By Watson E. Coleman
Attorney Patented Feb. 9, 1926.

1,571,995

UNITED STATES PATENT OFFICE.

FRANK W. BOMAN, OF MORO, ARKANSAS.

CONVERTIBLE PLOW FRAME.

Application filed August 12, 1922. Serial No. 581,530.

*To all whom it may concern:*

Be it known that I, FRANK W. BOMAN, a citizen of the United States, residing at Moro, in the county of Lee and State of Arkansas, have invented certain new and useful Improvements in Convertible Plow Frames, of which the following is a specification, reference being had to the accompanying drawings.

This invention relates to agricultural implements, and particularly to plows and like implements.

The general object of the invention is to provide a plow frame of such construction that practically all the ground cultivating implements necessary in order for a farmer to make a crop may be attached to the plow frame and properly adjusted with relation thereto.

A further object is to provide a plow frame and allied parts so constructed that it may be used as a double shovel plow, as a single shovel plow, as a middle burster plow, as a side harrow, as a turning plow, and as a scraper.

Other objects have to do with the details of construction and arrangement of parts as will appear more fully hereinafter.

My invention is illustrated in the accompanying drawings, wherein:—

Figure 1 is a side elevation of a plow frame constructed in accordance with my invention and showing the implement arranged as a double shovel plow;

Figure 2 is a section on the line 2—2 of Figure 1;

Figure 3 is a fragmentary vertical section through the plow beam, showing the manner in which the colter is held in place;

Figure 4 is a fragmentary section on the line 4—4 of Figure 1;

Figure 5 is a perspective view of the main shovel plow with the "burster" wings attached;

Figure 6 is a section on the line 6—6 of Figure 5;

Figure 7 is a perspective view of the adjustable rod which engages the colter.

Referring to Figures 1 and 2, 10 designates the plow beam and 11 the handles which extend upward and rearward from the middle portion of the plow beam and which are bolted at 12 to the plow beam and which are supported by the braces 13 bolted to the handle bars 11 and at their lower ends to the rear end portion of the plow beam. Bolted to the plow beam and extending downward and forward therefrom is a plow stock composed of two irons 14. This plow stock is braced against any rearward movement by a brace 15 whose upper end is twisted and angularly bent, as at 16, and fits against the under face of the plow beam. The lower end of the brace 15 extends between the irons 14 and is bolted thereto at 17, as indicated in dotted lines in Figure 1, and then extends rearward beyond the plow stock and is provided with a bolt 18. A rudder 19 at its forward end is pivoted to the rear end of the brace by means of a rivet 20. This rudder has an arcuate slot 21, through which the bolt 18 goes whereby the rudder may be set in adjusted position. Preferably the plow stock 14 is formed of a single bar of iron or steel bent at its middle upon itself, as at 22, so as to provide the parallel bars 14 and to embrace the rear end of the plow beam.

Extending along the under face of the plow beam is a strip of metal 23 which is deflected at its rear end, as at 24, to pass beneath the foot 16 of the brace 15 and through this deflected portion and through the foot 16 passes a bolt 25, the head of the bolt resting upon a metallic strip or iron 26 extending along the upper face of the beam. An eye bolt 27 passes through the beam forward of the lower ends of the handle bars, the eye being disposed against the strip 23 near the forward end thereof, while the nut 28 bears against the metallic strip 26 adjacent its forward end. The strip 26 is formed with a slot 29 and a corresponding slot 30 is formed in the beam 10, as shown clearly in Figure 3, and in the strip 26. This slot accommodates the shank of a colter 31 whose lower end is turned downwardly and rearwardly. This shank is formed upon its rear edge face with recesses 32 which engage with the rear wall of the slot 33 in the iron 26 so that the colter may be adjusted vertically and locked in its adjusted position. A wedge 37 is adapted to be disposed within the slot 30 either forward or rearward of the colter and will lock the colter in position. The colter may be held tight against this wedge lock and held clamped in its adjusted position by a clamping rod 38 whose rear end is slotted and through which the shank of the colter passes, the forward end of this rod being screw-threaded and passing through a lug 39 formed on the iron 26. The rod is screw-threaded for a nut 40 and by turning up this nut the upper portion of the shank of the colter may be drawn forward, clamping it either against the wall of the slot in case the wedge or block 37 is disposed rearward of the colter, or jamming it against this wedge or block, as illustrated in Figure 3. This permits the colter to be readily removed or adjusted and to be held in its adjusted position. The colter may be thrown backward or forward by shifting the block or wedge 37 from the rear to the front of the opening 30 or vice versa. The main foot or stock 14 may be raised or lowered by loosening the bolt 25 and shifting the brace 15 forward or backward, which is permitted by the slot 16ª in the foot 16.

Mounted upon the brace 15 is a foot 41, which is pivoted at 42 to the brace 15, extends rearward therefrom, and is clamped to the main foot or stock 14 by means of the U-bolt 43 and the clamp iron 44, as shown in Figure 4. This foot 41 or stock is laterally deflected, as illustrated in Figure 2, and downwardly extended and carries at its lower end a plow 45. The downwardly curved rear edge of the foot or stock 41 is notched, as at 46, and engaging with this notch is a bracing rod 47 which extends forward, as shown in Figures 1 and 2, and is formed at its forward end with a hook 48 engaging the eye of the bolt 27. The rear end of the rod 47 is formed with a hook 49 which engages in any one of the notches 46.

It will be seen that the auxiliary stock or foot 41 may be adjusted vertically by releasing the clamp bolt 43 and shifting the plow stock up or down and engaging the rod 47 with the proper notch 46. The lower end of the stock 41 is formed with an eye 50 and the plow 45 is held to the lower end of the stock by means of a bolt 51 passing through this eye. Thus this plow is removable from the stock. The plow 52 on the main stock 14 is held in place by a bolt 53 passing through the bight formed at the lower end of the main stock. The plows 52 and 45 may be interchanged on the two stocks 14 and 41 for shallow or deep plowing, as desired. In order to change the plow to a single shovel stock, the clamps 43 and 44 are removed, the bolt 42 is removed, the clamp rod 47 is loosened, and the auxiliary stock 41 with the plow 45 is removed. In order to change this plow into a middle "burster" plow, wings 54 are bolted to the shovel plow 52.

This implement as described may be used in connection with a harrow and particularly a side harrow, and a turning plow may also be used with the implement or a scraper blade may be used and thus it will be seen that with a frame or plow constructed as above described, it is possible to convert the plow into a number of different plowing or cultivating implements, and that a plow frame of this character permits the farmer to completely make a crop by the one implement. It will be seen that the adjustments are very simple, that the plows are interchangeable and removable, and that the plow feet are thoroughly braced against any strain.

While I have illustrated details of construction which I believe to be particularly advantageous, I do not wish to be limited thereto, as it is obvious that many changes might be made therein without departing from the spirit of the invention as embodied in the accompanying claims.

I claim:

1. An implement of the character described including a beam having rearwardly directed handle bars, a plow stock operatively pivoted to the beam extending downward therefrom, a brace adjustably engaged with the beam forward of the stock for forward and rearward adjustment and extending downward across the stock to a point rearward of the same and being pivoted to the stock, a rudder pivoted upon the lower end of said brace rearward of the stock for vertical movement, and means for holding the rudder in vertically adjusted position.

2. An implement of the character described including a beam having rearwardly directed handle bars, a plow stock extending downward from and pivotally connected to the rear end of the beam, a brace adjustably engaged at its upper end with the beam for forward and rearward movement and pivotally engaged with the lower portion of the stock, and an auxiliary stock pivotally connected to the brace and extending across the first named stock, and a clamp adjustably engaging the auxiliary stock with the main stock, the auxiliary stock being laterally deflected.

3. An implement of the character described comprising a beam having upwardly and rearwardly extending handle bars, a stock pivotally connected at its upper end to the rear end of the beam and comprising opposed spaced members, a bolt passing through the beam forward of the stock, a brace having a foot bearing against the under side of the beam and slotted to receive said bolt, the brace extending between the members of said stock and being pivotally connected thereto at its lower end, an auxiliary stock pivotally and detachably connected to the brace and extending across one face of the main stock and then being laterally deflected, a clamp embracing one of the members of the main stock and said auxiliary stock and adjustable along the main stock, a bolt passing downward through the beam and having a clamping eye at its lower end, and a rod having hooked engagement with said eye and with the rear end of the auxiliary stock.

In testimony whereof I hereunto affix my signature.

FRANK W. BOMAN.